Figure 3:
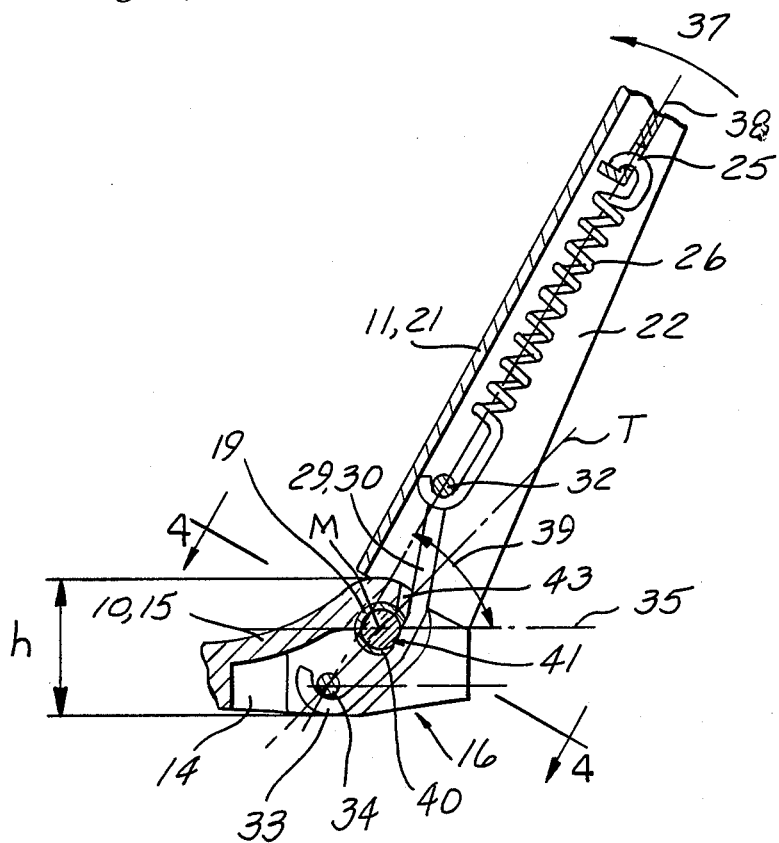

United States Patent [19]

Bauer et al.

[11] Patent Number: 4,947,508
[45] Date of Patent: Aug. 14, 1990

[54] WIPER ARM, ESPECIALLY FOR MOTOR VEHICLE WINDSHIELD WIPER SYSTEMS

[75] Inventors: Kurt Bauer, Ingersheim; Hans Prohaska, Bietigheim-Bissingen; Eckhardt Schmid, Brackenheim, all of Fed. Rep. of Germany

[73] Assignee: SWF Auto-Electric GmbH, Bietigheim-Bissingen, Fed. Rep. of Germany

[21] Appl. No.: 353,651

[22] PCT Filed: Nov. 26, 1987

[86] PCT No.: PCT/EP87/00732
§ 371 Date: May 11, 1989
§ 102(e) Date: May 11, 1989

[87] PCT Pub. No.: WO89/00936
PCT Pub. Date: Feb. 9, 1989

[30] Foreign Application Priority Data

Jul. 25, 1987 [DE] Fed. Rep. of Germany ....... 3724777

[51] Int. Cl.[5] .............................................. B60S 1/32
[52] U.S. Cl. .................................................. 15/250.35
[58] Field of Search ........... 15/250.19, 250.20, 250.31, 15/250.32, 250.33, 250.34, 250.35

[56] References Cited

U.S. PATENT DOCUMENTS

| 3,378,874 | 4/1968 | Scinta | 15/250.32 |
| 3,405,420 | 10/1968 | Smithers et al. | 15/250.35 |
| 4,559,663 | 12/1985 | Bauer et al. | 15/250.34 |
| 4,564,971 | 1/1986 | Pethers et al. | 15/250.35 |

FOREIGN PATENT DOCUMENTS

| 3521527 | 12/1986 | Fed. Rep. of Germany . | |
| 3530108 | 12/1986 | Fed. Rep. of Germany ... | 15/250.20 |
| 1288741 | 2/1962 | France | 15/250.32 |
| 1405818 | 6/1965 | France | 15/250.35 |
| 2050604 | 4/1971 | France . | |
| 2021939 | 12/1979 | United Kingdom | 15/250.34 |

Primary Examiner—Harvey C. Hornsby
Assistant Examiner—Joseph S. Machuga
Attorney, Agent, or Firm—Robert P. Seitter

[57] ABSTRACT

This invention describes a wiper arm, which in the receiving area (19, 14, 15) for the swivelling axis (18) between fastening member (10) and link (11) has a recess (40, 43), which permits a dipping of the spring holding yoke (30) into the swivelling axis receiving area (19, 14, 15) for achieving a stable tilted position (A) of the link (11). Thereby a low mode of construction of the wiper arm can be adhered to. In a preferred embodiment there is provided a hole-shaped recess (40) in a rolled bearing bush (19). which otherwise extends round and along the entire swivelling axis (18) thereby ensuring in addition a good guidance of the swivelling axis.

3 Claims, 3 Drawing Sheets

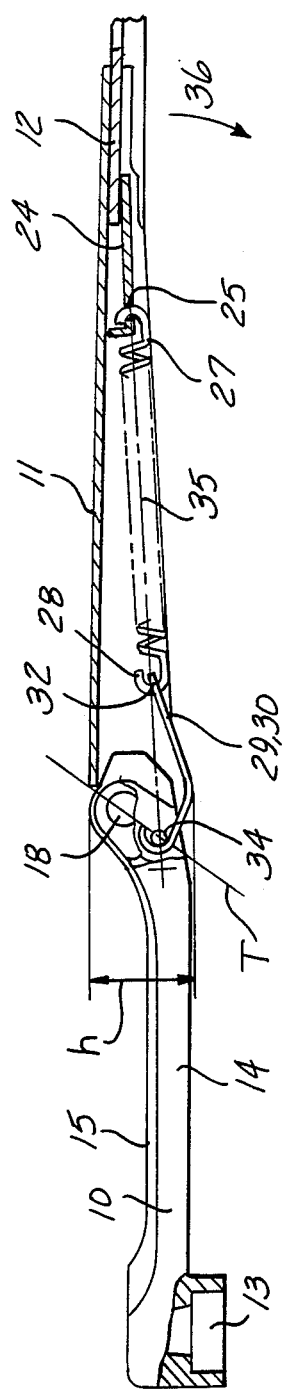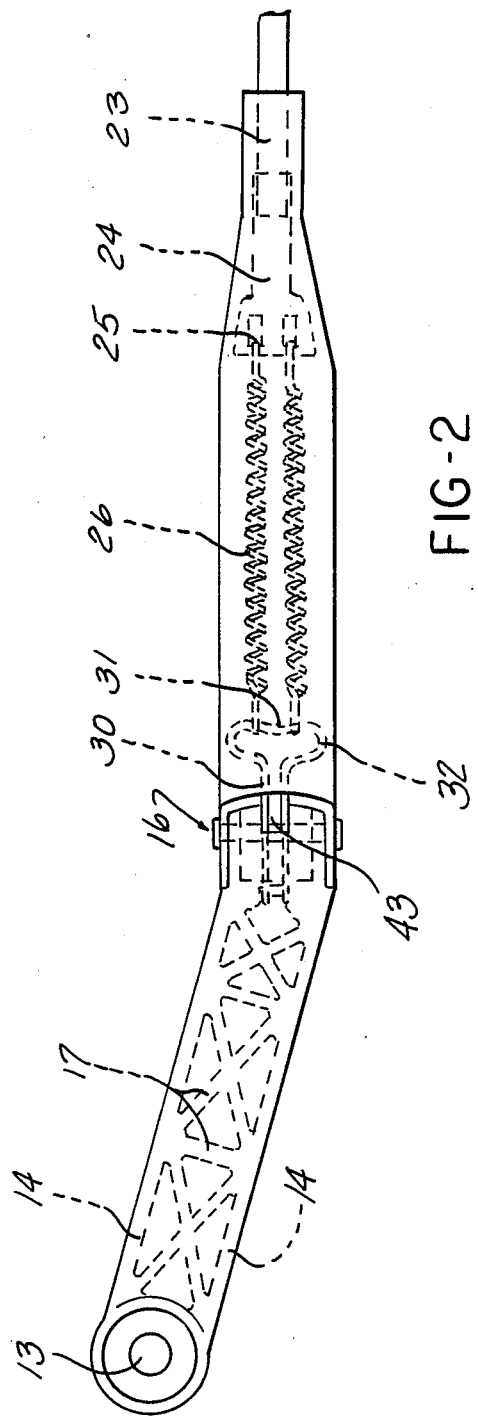

WIPER ARM, ESPECIALLY FOR MOTOR VEHICLE WINDSHIELD WIPER SYSTEMS

DESCRIPTION

This invention relates to a windshield wiper arm which may be pivoted between a windshield engaging wiping position and a position in which the arm is titled away from the windshield, as for replacement of the wiper blade, and retained in either position by a spring whose line of action passes over center of the pivot axis during movement between the two positions.

Nowadays motor vehicles are sometimes constructed in such a way that a windshield wiper has to be fixed in a narrow slot positioned between the windshield and the hood or the trunk lid, because the windshield wiper is not to be seen in the parking position and is to occupy a so-called concealed parking position.

In order to be able to exchange the wiper blade of a windshield wiper without any problems it is desired that the link of the wiper arm, mostly holding a wiper blade through a wiper rod, may be titled from the window pane into a stable position, in which the front end of the wiper arm is as far away from the window pane as possible. The stable titled position can be achieved by so far swivelling the link with the spring element and, if required, the yoke relative to the fastening member about the swivelling axis between fastening member and link which is normally realized by a rivet pin formed as a bearing pin guided in a tube-shaped receiver formed by a bearing bush surrounded by fastening member material which normally is a casted material, so that the line of application of the spring element as is known extending between the two points of articulation crosses the swivelling axis between link and fastening member until the spring element has passed the dead center line relative to the swivelling axis which former as is known intersects the line through the center of the swivelling axis and the spring element or the yoke hits the area of the fastening member guiding the swivelling axis or until the link hits the upper side of the fastening member. A wiper arm of this kind is for example known from the German patent 2 105 101. Here a tension spring is on the one hand nested in an area of a wiper rod riveted with the link, wherein this area is positioned in front of the swivelling axis and the link and on the other hand in an area farther to the rear but still in front of the swivelling axis on an approximately C-shaped, downwardly curved yoke which is articulated on a holding pin arranged on the fastening member. This point of articulation is arranged behind and under the swivelling axis between fastening member and link in such a way that in the operating position of the link the line of application of the spring element is positioned with a spacing below the swivelling axis and the spring element draws the link downwardly in the direction of the window pane to be cleaned. The points of articulation of the spring element on the yoke and the point of articulation of the yoke on the fastening member are thereby positioned on a straight line below the swivelling axis. The link can be brought into a stable tilted position by swivelling about the swivelling axis, in which tilted position the link rests against the upper side of the fastening member by means of a lengthening bent therefrom. Here the tilting angle amounts to about 45 degrees. The points of articulation of the spring element and the point of articulation of the yoke on the link are thereby positioned on a straight line beyond the dead center of the spring element relative to the swivelling axis. Here this stable tilted position can only be achieved, because the yoke is curved in such a way that it does not hit the tube-shaped receiver before the line of application of the spring element has passed the dead center relative to the swivelling axis. Upon a premature stop motion of the yoke the link would again snap back in the direction of the window pane, if for example the link is let off in a wiper blade exchange, so that the window pane might be damaged thereby. However because of the relatively intensive curvature of the yoke the overall height of the wiper arm is so large that the latter cannot be applied in all cases of windshield wiper systems with concealed parking position. In theory a less intensively curved yoke could be used and the overall height of the wiper arm could thereby be reduced by moving the point of articulation of the yoke on the fastening member farther to the front. Then however a very large tilting angle is necessary for the link to achieve a stable tilted position. Moreover the area of the windshield wiper arm positioned in front of the swivelling axis has do be made very long, if the yoke is to be as long as designed up to now and the spring element used up to now is continued to be used.

It is an object of the invention to create a wiper arm of the initially mentioned kind with a stable tilted position, in which the line of application of the spring element lies beyond the dead center line of the spring, and which wiper arm is especially compact and low and can be made as reasonably priced as possible.

This problem is solved by a wiper arm which is constructed according to the present invention. Because of the recess it is possible that the spring element or the yoke carrying it can dip far into the area of the swivelling axis, so that in the tilted position the dead center line of the spring element relative to the swivelling axis can also be passed with a spring element or yoke which is not at all curved or which is less intensively curved and the tilted position can thus be shifted to the safe side. As a matter of fact the construction of the wiper arm in the area of the swivelling axis according to the invention ensures a low overall height of the wiper arm with the previously described stable tilted position.

Due to the fact that the recess does not completely penetrate the swivelling axis, that means that two swivelling axis parts spaced from each other as for example two rivet pins are not necessary, the advantageous construction of the wiper arm using only one swivelling axis member is retained which is favourable with regard to costs. Because of the suggested recess the known advantageous guidance of the swivelling axis is retained over the entire shank length of the axis which extends over the entire wiper arm width, that is for a rivet pin from the set head to the closing head.

Thereby it might be sufficient in most cases of application to leave the swivelling axis itself unworked that is to say without a recess. If the swivelling axis is guided in a bearing bush as is usual, the bearing bush may be provided with a recess. If conventional, relatively thin bearing bushes are used a recess is suggested which reaches as far as to the generated surface of the swivelling axis and resembles a hole. The bearing bush is then closed everywhere all around with the exception of the area of the recess. As far as thicker bearing bushes are concerned a recess can be used which is formed as an annular groove. In this case the bearing bush is closed everywhere all around. In comparison with known embodiments having two bearing bushes arranged on the swivelling axis with an axial spacing where, as a matter of fact, the swivelling axis is completely uncovered in the middle of its length both kinds of bearing bushes have the advantage of a better guidance of the the swivelling axis, because it is a large-area guidance.

Here the use of a single specifically developed bearing bush is at least more favourably priced than the use of two smooth bearing bushes, if the bearing bushes, as is usual in itself, are made from one piece of sheet metal by means of a rolling treatment. A specific shape of the sheet metal piece to be rolled does not affect the costs of the rolling treatment. For a wiper arm to be equipped with two bearing bushes in contrast thereto costs incur for two rolling treatments and its production is therefore more expensive than that of a wiper arm according to the invention.

Under the present invention the single bearing bush is formed by first stamping a flat sheet metal blank with aligned recesses in two opposite side edges. The blank is then rolled into a hollow cylinder with the opposite side edges abutting each other to form a longitudinal seam and the two recesses cooperatively defining an aperture through the wall of the completed bearing bush.

Further advantageous details and developments of the invention can be seen from the rest of the subclaims and from the drawing illustrated below, which shows one embodiment. It is shown in FIG. 1 a longitudinal section through a portion of a wiper arm according to the invention, in FIG. 2 the wiper portion in a top view, in FIG. 3 a partial section from FIG. 1 at an enlarged scale with the wiper arm link in tilted position, in FIG. 4 a section taken on the line IV—IV in FIG. 3, in FIG. 5 a perspective view of a bearing bush at an enlarged scale and in FIG. 6 a top view on the sheet metal piece provided for the production of the bearing bush.

The wiper arm shown in FIGS. 1 to 4 has a fastening member 10, a link 11 and a wiper rod 12. The wiper arm can in a known manner be connected in a torsionally firm way with a wiper shaft not shown in the drawing by a bore 13 at the rear end of the fastening member 10. The wiper rod 12 is connected with the link 11 and at its front end not shown in the drawing it carries a wiper blade.

The fastening member is made from a zinc die-casting alloy and in front of the bore 13 it has two long side walls 14 extending in the longitudinal direction of the wiper arm and beeing laterally spaced from each other and the upper ends of which are connected by a cover wall 15. With the exception of the area of the front end 16 of the fastening member 10 the walls 14 and 15 are also interconnected by cross-struts 17. The front end of the fastening member 10 extends at an angle to the other areas of the fastening member 10 and in a line with the link in the longitudinal direction of the wiper arm. The described shape of the fasteningn member 10 has been selected, because the wiper shaft extends relatively far below the window pane to be wiped and the wiper arm-and-blade assembly composed of wiper blade and wiper arm can thus extend in a so-called concealed parking position at least over part of its length, for example in a slot bordered by the splash shield and the hood of a motor vehicle.

Closely to the front end 16 of the fastening member 10 the link 11 and thus the parts of wiper rod 12 and wiper blade connected with it are mounted on the fastening member 10 to be swivelled about a swivelling axis 18 extending transversely to the longitudinal direction of the wiper arm and realized by a rivet pin. The swivelling axis 18 is surrounded by a cylindric bearing bush 19 which is pressed into bores 20 in the side walls 14 of the fastening member 10 (compare FIG. 4), which bores are flush with each other. The bearing bush 19 extends almost over the entire shaft length 1 of the pin 18, that means between its heads 18a and 18b. The link 11 is made from a metal sheet and has an approximately U-shaped cross section. It comprises a web 21 at its upper side and two side walls 22 extending over part of the outer sides of the fastening member 10 and encompassing the swivelling axis 18. The front end of the link 11 encompasses the rear end 23 of the wiper rod 12.

Figure 4:
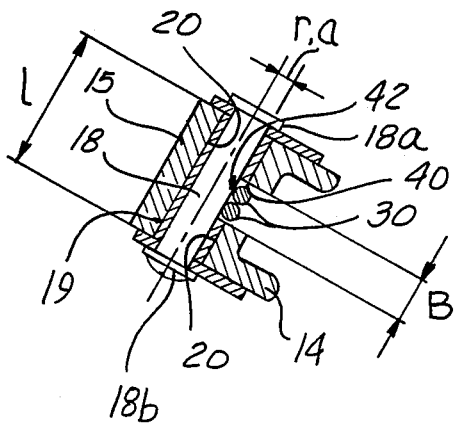

The rear end 23 of the wiper rod 12 is straight and is encompassed by a clamping member 24, which has two apertures 25 laterally arranged one beside the other in its widening rear end. In the apertures 25 are hung in two spring elements formed as tension springs 26 slightly spaced from each other and laterally extending one beside the other in the link interior by means of their front ends 27 upwardly bent in the manner of a hook and thus articulated on the link 10. The rear ends 28 of the tension springs 26 are suspended on a yoke 29. The yoke 29 is made of a steel wire bent approximately in the manner of a U and has two U-shanks 30 connected with each other by the U-curvature 31. The center of the U-curvature is slightly bent to the interior, so that its lateral areas 32 project somewhat in the longitudinal direction. The tension springs 26 are hung in these lateral areas 32, so that the tension springs are always laterally spaced from each other as desired. The two U-shanks 30 of the yoke 29 are slightly curved in downward direction over the major part of their length, and, as FIG. 4 shows closely to each other. With their hook-shaped upwardly bent free ends 33 the U-shanks 30 of the yoke 29 encompass a pin 34 extending between the side walls 14 of the fastening member 10 behind and below the swivelling axis 18 and is pressend into openings there.

The connecting line 35, which is identical with the line of application of the spring element and conceived between the point of articulation 25 of each tension spring 26 on the link 11 and the point of articulation 32 of each tension spring 26 on the yoke 29 and the point of articulation 34 of each yoke shank 30 on the fastening member 10, is in the operating position B located with a spacing below the swivelling axis 18 beyond the dead center line T of the spring elements 26 relative to the swivelling axis 18. In the operating position B the link 11 and the wiper blade connected with it are thereby prestressed in downward direction towards the window pane not shown in the drawing in a swivelling direction indicated by arrow 36 in FIG. 1.

For an exchange of the wiper blade or if otherwise desired the link 11 together with the wiper rod 12 and the wiper blade can be brought into a stable tilted position A from the operating position B by swivelling the link 11 about the swivelling axis 18 in an upward direction indicated by arrow 37. In this tilted position the link 11 cannot be drawn back into the operating position B inadvertently and the wiper rod 12 cannot hit the window pane and damage it. As FIG. 3 shows in the stable tilted position A the points of articulation 25, 32 and 34 of the spring elements 26 and thus their lines of application 38 are positioned beyond the dead center line T of the spring elements 26 relative to the swivelling axis 18. Thus the lines of application 38 of the spring elements 26 in the tilted position A and the lines of application 35 of the spring elements 26 in the operating position B enclose an angle 39 of about 60 degrees opening towards the front end of the wiper arm (wiper rod 12 etc). Thus the so-called tilting angle of the wiper arm amounts to about 60 degrees. Thus it is so far positioned beyond the dead center lines T of the spring elements relative to the swivelling axis 18, that with utmost reliability the link 11 cannot snap back.

Nevertheless the wiper arm in its highest portion positioned in the area of the swivelling axis 18 has only an overall height h of about 22 mm. Therefore it is excellently suitable to be used on motor vehicle windshield wiper systems with concealed parking position in a narrow slot. In spite of the large tilting angle 39 the low overall height h with stable tilted position A is possible, because the bearing bush 19 has a recess 40 whose dimensions are adapted to the yoke 29, which in the tilted position A permits the yoke 29 to dip into the bearing bush 19, and that as far as to the generated surface 41 of the swivelling axis 18, that is to say the rivet pin. As in particular FIG. 3 shows the recess 40 extends over an angular range of about 90 degrees. It is provided in the middle of the longitudinal or axial extension of the swivelling axis 18 and the bearing bush 19 and in this direction it reaches slightly farther than the yoke 29, and that, as FIG. 4 shows, as far as the two shanks 30. Thus it has a width B which is slightly larger than the measurement formed by the two diameters of the yoke shanks 30 and their lateral spacing.

The yoke shanks 30 are thereby downwardly bent in such a way that the largest perpendicular spacing a between each line of application 38 of the spring element in the titlted position A and the face 42 of the yoke shanks 30 facing it is slightly larger than the radius r of the swivelling axis 18, that is to say the rivet pin. Moreover the yoke curvature and the spacing a are adapted to the arrangement of the points of articulation 25, 32 and 34 of the spring in such a way, that the previously mentioned tilting angle 39 of about 60 degrees is achieved.

As FIGS. 2 and 3 show the cover wall 15 connecting the upper ends of the side walls 14 of the fastening member 10 does not extend over such a large angular area as in the lateral regions round the bearing bush 19. For this purpose the cover wall has a cutting 43 which in the swivelling direction 37 of the yoke is flush with the recess 40 in the bearing bush 19, which cutting ends with a spacing from the recess 40 and thus from the yoke 29 in the tilted position A. This measure also contributes that the tilted position A described is reached.

Figure 5:
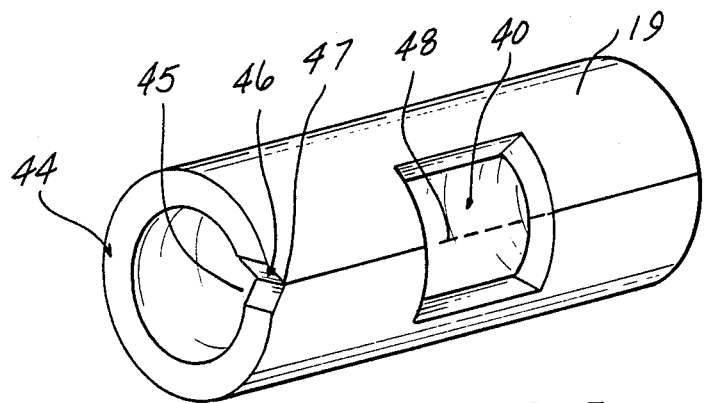

As FIG. 5 shows the recess 40 is thereby of a rectangular shape. Principally it could however also be ovel or, with a larger dimension of the spacing oder a larger cross section or thickness of the yoke shanks 30 be also round. As FIG. 5 furthermore shows the the bearing bush 19 has a fixing groove 45. This fixing groove extends over a short distance along the long side of the bearing bush 19 from one basis thereof, namely the basis 44. Here the fixing groove 45 has a bent groove bottom 46 whose acute edge 47 extends towards the recess 40 and is located on the same line with the conceived longitudinal center line 48 of the latter. Thus the fixing groove makes possible a completely exact adjustment of the bearing bush 19 relative to the yoke 29 when the bearing bush is mounted, so that it is ensured that the yoke 29 rests against the swivelling axis 18 as desired.

Figure 6:
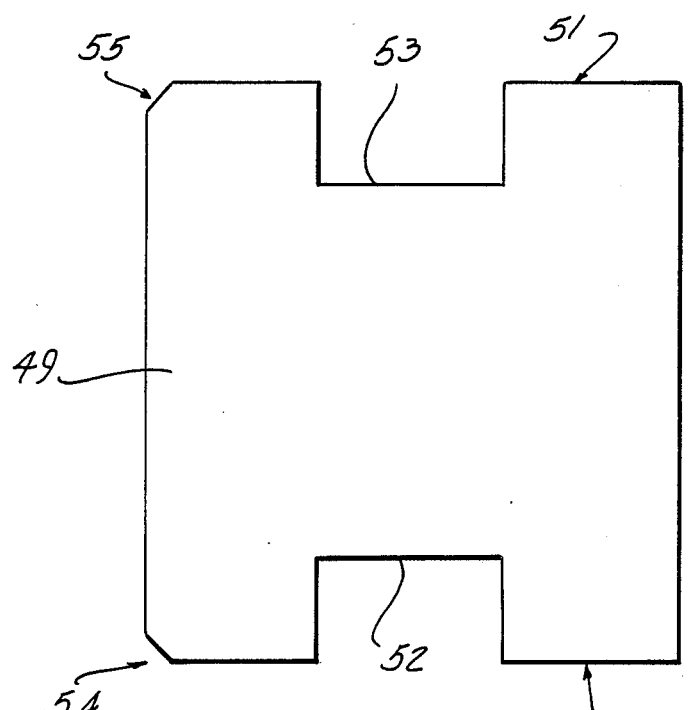

The bearing bush 19 has been made by rolling out of a substantially rectangular sheet metal piece 49 which is shown in FIG. 6. In the area of two edges 50 and 51 opposite to each other there is punched out a cutting 52 or 53 each cutting reaching from the edges 50 and 51 towards the interior of the sheet metal piece. After rolling the cuttings 52 and 53 form the recess 40 of the bearing bush 19. As FIG. 6 furthermore shows the cuttings 52 and 53 have the samed depth. Thus the rolling seam coincides with the conceived longitudinal middle line 48 (FIG. 5) of the bearing bush 19, so that also this measure helps to adjust the bearing bush 19.

The fixing groove of the bearing bush 19 has been created in that from the sheet metal piece 19 on the one hand from the edge 50 and on the other hand from the edge 51 triangular areas 54 and 55 are punched out on two opposite corners. After the rolling action the bordering surfaces of the rectangular areas 54 and 55 form the groove bottom 46 (FIG. 5).

Thus the bearing bush 19 of relatively complicated shape has been produced in a simple way at reasonable costs.

We claim:

1. In a windshield wiper assembly comprising a rigid wiper arm adapted to be mounted at one end for rotary wiping oscillation, an elongate wiper carrying link, pivot means mounting one end of said link upon the other end of said arm for pivotal movement about a pivot axis between a normal wiping position wherein said link is in a general longitudinal alignment with said arm and a tilted position wherein said link is inclined relative to said arm, tension spring means coupled at one end to said link and coupled at its other end to said arm at a location offset from said pivot axis such that the line of action of said spring means passes to one side of said pivot axis to bias said link toward said wiping position and passes to the opposite side of said pivot axis to bias said link to said tilted position;

the improvement wherein said pivot means comprises a pivot pin, a bushing extending substantially the entire length of said pin rotatably receiving said pin and mounted at its opposite ends in said arm, said bushing comprising a hollow cylindrical tube having a longitudinal seam defined by the abutment of two longitudinally extending edges, and means defining a pair of opposed cutout portions extending circumferentially of said tube respectively from said edges to cooperatively define an aperture in one side of said tube exposing said pin and adapted to enable the spring means to contact said pin when said link is in its tilted position.

2. The invention defined in claim 1 wherein the width of said aperture longitudinally of said bushing is greater than the corresponding dimension of the spring means in contact therewith when said link is in said tilted position.

3. The invention defined in claim 2 wherein said aperture is located approximately midway of the length of said bushing.

* * * * *